June 3, 1958 H. H. MUELLER 2,837,337

AUTOMATIC INTERLOCKING DUAL PHONOGRAPH
RECORD PLAYER WITH SELECTIVE CONTROL

Filed Oct. 16, 1952 5 Sheets-Sheet 1

Herman H. Mueller
INVENTOR.

BY Clarence A. O'Brien
and Harvey B. Jacobson
Attorneys

June 3, 1958 H. H. MUELLER 2,837,337
AUTOMATIC INTERLOCKING DUAL PHONOGRAPH
RECORD PLAYER WITH SELECTIVE CONTROL
Filed Oct. 16, 1952 5 Sheets-Sheet 2

Herman H. Mueller
INVENTOR.

BY Clarence A. O'Brien
and Harvey B. Jacobson
Attorneys

Herman H. Mueller
INVENTOR.

BY Clarence A. O'Brien
and Harvey B. Jacobson
Attorneys

June 3, 1958

H. H. MUELLER 2,837,337

AUTOMATIC INTERLOCKING DUAL PHONOGRAPH RECORD PLAYER WITH SELECTIVE CONTROL

Filed Oct. 16, 1952

5 Sheets-Sheet 4

Herman H. Mueller
INVENTOR.

BY Clarence A. O'Brien and Harvey B. Jacobson
Attorneys

June 3, 1958 H. H. MUELLER 2,837,337

AUTOMATIC INTERLOCKING DUAL PHONOGRAPH RECORD PLAYER WITH SELECTIVE CONTROL

Filed Oct. 16, 1952 5 Sheets-Sheet 5

Herman H. Mueller
INVENTOR.

BY Clarence A. O'Brien
and Harvey B. Jacobson
Attorneys

United States Patent Office 2,837,337

Patented June 3, 1958

2,837,337

AUTOMATIC INTERLOCKING DUAL PHONOGRAPH RECORD PLAYER WITH SELECTIVE CONTROL

Herman H. Mueller, Ephrata, Pa., assignor of small interests to various assignees Application October 16, 1952, Serial No. 314,987

16 Claims. (Cl. 274—10)

This invention comprises novel and useful improvements in an automatic interlocking dual phonograph record player with selective control and more specifically pertains to an automatic phonographic apparatus particularly designed and constructed for automatically playing a plurality of phonographic records, either of the conventional sizes or of the micro groove long playing type.

A primary object of this invention is to provide improvements in the automatic phonographic apparatus set forth in my prior copending application Serial No. 98,048 filed June 9, 1949, now Patent No. 2,729,455, issued Jan. 3, 1956.

A further object of the invention is to provide an improvement upon my above identified copending application, wherein the operating mechanism thereof may be converted from automatically playing both sides of the records in sequence in a stack of records, to the automatic playing of the top side only of the records in sequence in a stack of records in the same manner as conventional record players, while retaining all of the advantages set forth and claimed in my above identified copending application of an interlocking, positive nonslip driving engagement between the turntable and the record or records resting thereon.

A still further object is to provide an improvement upon the record player disclosed in my above identified copending application wherein the tone arm tilting mechanism may be temporarily disconnected from the tone arm, whereby the automatic movement of the tone arm into its upper and lower positions for playing both sides of a record may be discontinued; and whereby the disengagement of the tone arm driving mechanism may be effected in synchronization with and by the same control means as that for temporarily disengaging the pressure arm assembly and operating mechanism.

More specifically, it is a particular object of this invention to provide a mechanism whereby the record spacing and supporting assembly which is set forth in detail and claimed in my above identified copending application, may be temporarily operatively disengaged from the automatic playing mechanism whereby the apparatus, without further change, may be rendered capable of playing in sequence the top sides only of a stack of records in accordance with the usual manner.

These, together with various ancillary features and objects of the invention, which will later become apparent as the following description proceeds, are attained by the present invention, a preferred embodiment of which has been illustrated, by way of example only, in the accompanying drawings, wherein.

Figure 10:
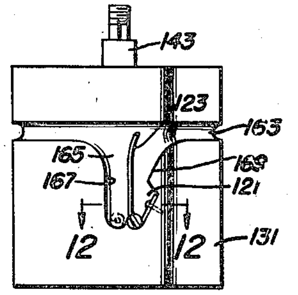
Figure 11:
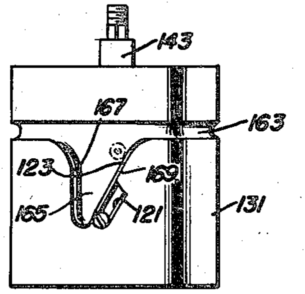
Figure 12:
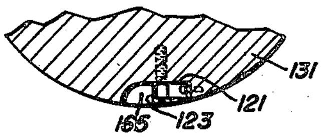
Figure 8:
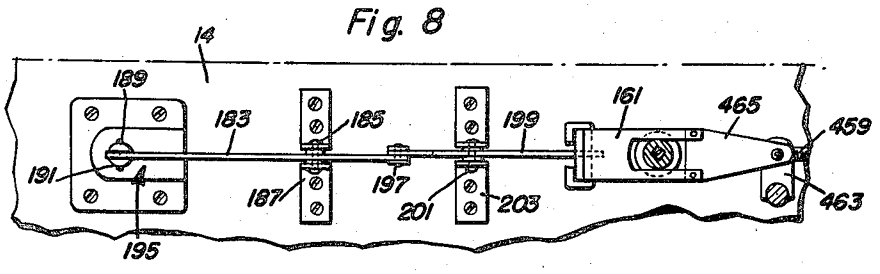
Figure 9:
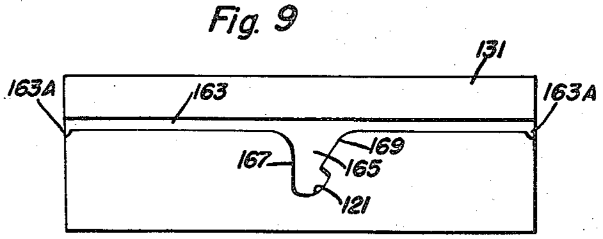
Figure 3:
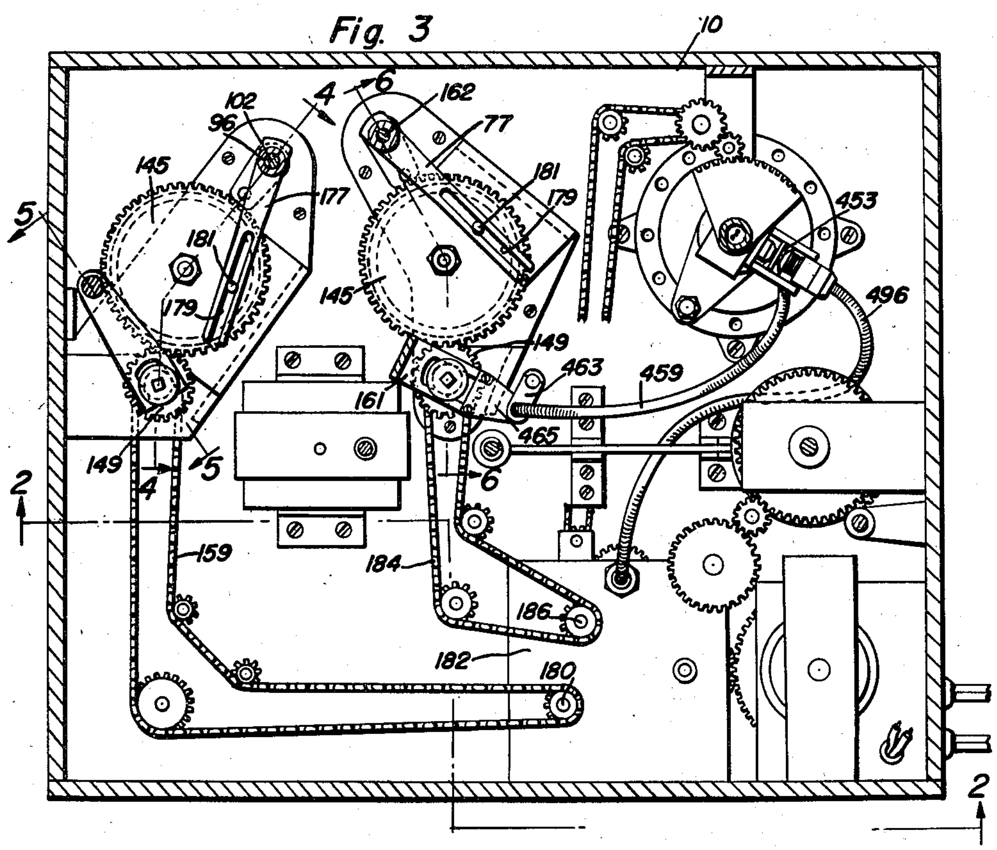
Figure 3 is a horizontal view, parts being shown in section of the apparatus of Figures 1 and 2.
Figure 7:
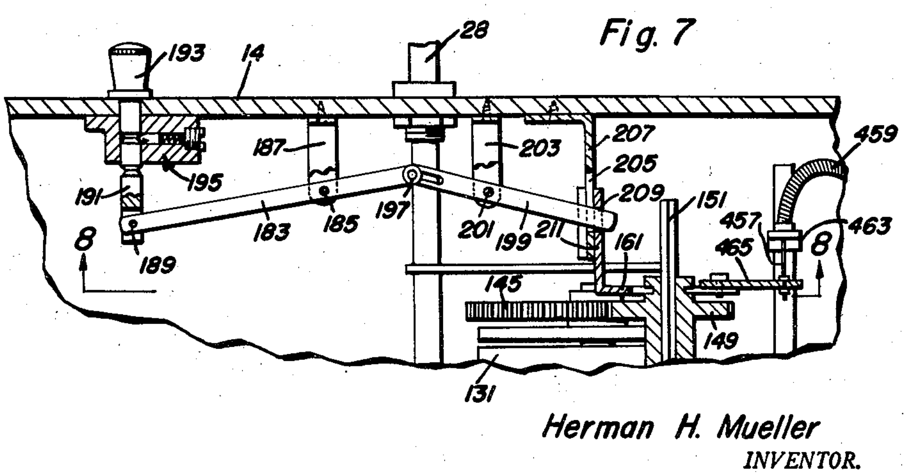
Figure 4:
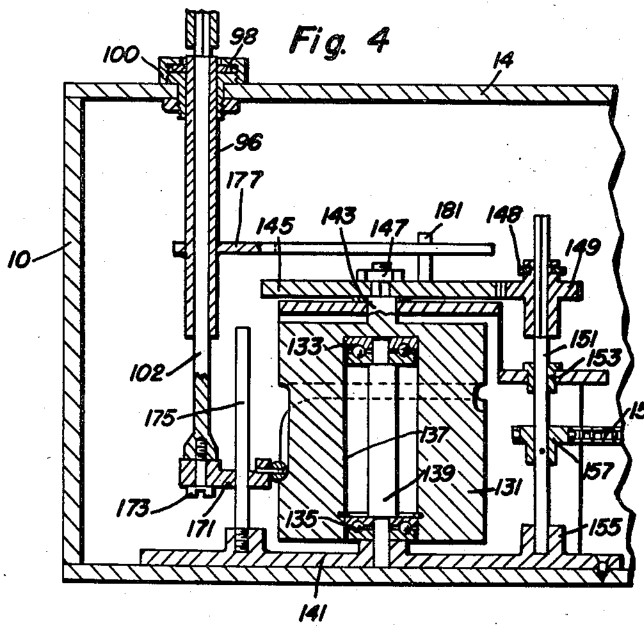
Figure 5:
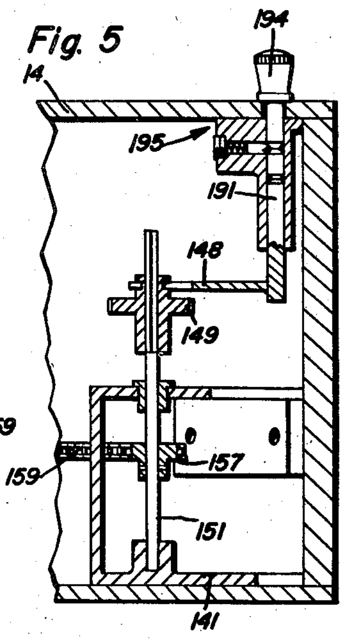
Figure 6:
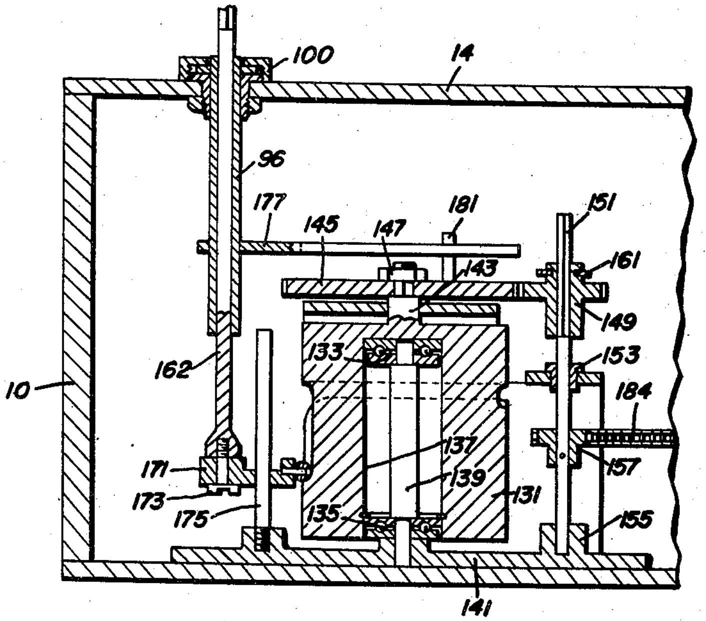
Figures 13, 14, 15:
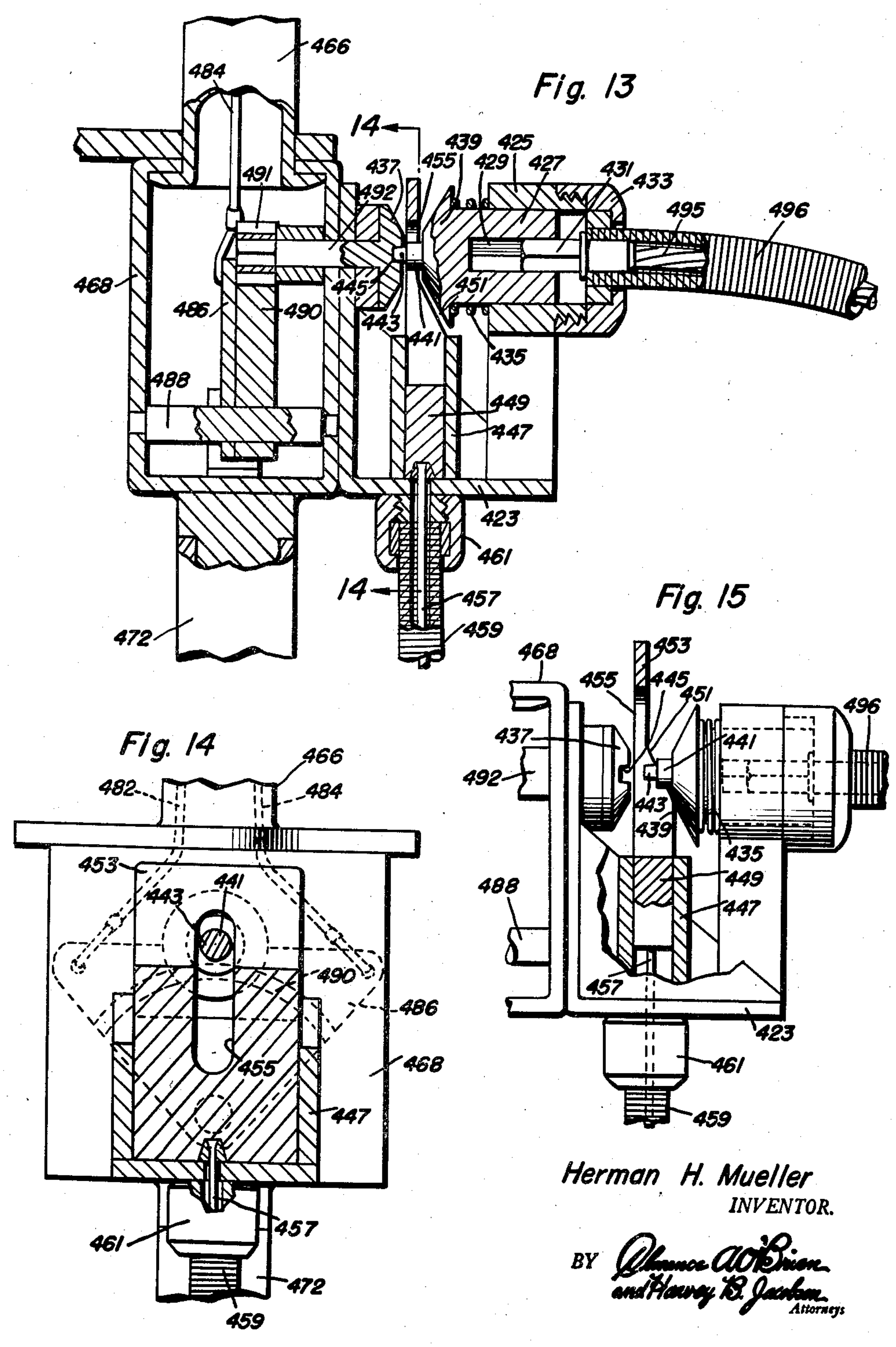

Figures 4 and 5 are vertical sectional detail views, parts being broken away, and taken upon an enlarged scale substantially upon the planes indicated by the section lines 4—4 and 5—5 respectively of Figure 3, illustrating part of the operating mechanism of the record spacing and supporting assembly;

Figure 6 is a vertical sectional detail view, parts being broken away and taken upon an enlarged scale substantially upon the plane indicated by the broken section line 6—6 of Figure 3, illustrating a portion of the operating mechanism of the pressure arm;

Figure 7 is a vertical sectional detail view showing a portion of the selective control mechanism for the pressure arm and operating mechanism and for the tone arm whereby the record playing apparatus may be converted from the automatic sequential playing of both sides of the records of a series of records to the automatic playing of the top sides thereof only;

Figure 8 is a horizontal sectional view taken substantially upon the plane indicated by the section line 8—8 of Figure 7;

Figure 9 is a development in plan of one of the cams forming a part of the improvement of this application;

Figures 10 and 11 are elevational views of one of the cams of Figure 9, showing different operative positions of the parts thereof;

Figure 12 is a horizontal sectional detail view of a portion of a cam, showing the mounting of a resilient cam surface thereon, being taken substantially upon the plane designated by the section line 12—12 of Figure 10;

Figure 13 is an enlarged view in vertical section through a portion of the tone arm tilting mechanism in its operative position;

Figure 14 is a vertical sectional view taken substantially upon the plane of the section line 14—14 of Figure 13; and Figure 15 is a fragmentary view, partly in elevation and partly in vertical section of the portion of Figure 13 but showing the position of the parts when the tone arm tilting mechanism is in its inoperative position.

Reference is now made more specifically to the accompanying drawings, wherein like numerals designate similar parts throughout the various views.

The phonographic apparatus disclosed in this application is identically the same as that disclosed in my above identified copending application, and it is to this particular type of apparatus that the improvement of the present invention is especially directed and has been applied. In the drawings, the apparatus disclosed is adapted to play a plurality of records on both sides in a novel and wearless manner, and with a positive non-slipping drive of the records to prevent any possible slippage therebetween and thus insure accurate tone reproduction and a minimum of wear of the records. The apparatus enables the playing of both sides of a stack of records without changing the horizontal position of the record to be played by swinging the tone arm horizontally and vertically, so that the needles or styluses carried by the tone arm are brought into reproducing contact in succession with the playing surfaces on the lower and top sides of each record in turn.

Thus, means is provided for spacing the record to be played from the turntable and for rotating the record responsive to rotation of the turntable, so that the tone arm may reproducingly ride upon the sound track formed on the underside of the record and on the top side of the record in a sequential manner. The turntable is formed or covered with a novel interlocking non-slipping clutch surface and the records are also formed with complementary interlocking, positively engaging clutch surfaces adapted to interlock with the clutch surface on the turntable in a manner as disclosed in my prior Patent No. 2,559,786, patented July 10, 1951. A record spacing and supporting assembly which may consist of an arm having a plurality of vertically disposed idler rollers or gears having undulated toothed peripheries, is pivotally disposed adjacent and above the turntable and is adapted to be moved into and out of interposition between the turntable and the stack of records supported thereabove and also below the record which has been released and lowered from the bottom of the stack and which is to be played upon its lower surface. Thus, the record is seated on the undulated toothed peripheries of the rollers or gears and is supported thereby in a spaced manner above the turntable and is rotated responsive to the turntable by the connecting means.

A pressure arm is pivotally carried adjacent the turntable and is adapted to swing inwardly between the turntable and the stack of records and seat on the top of the record to be played and hold the record in firm engagement on the supporting and driving rollers of the record spacing and driving assembly. The tone arm is pivotally disposed adjacent the turntable and is moved vertically and horizontally in a curvilinear path so as to swing inwardly and outwardly in a horizontal plane and to swing upwardly and downwardly beyond the periphery of the record and also to move upwardly and downwardly, in playing position to sequentially play the lower and top sound tracks respectively of a record in sequence.

The tone arm is provided with a plurality of extending needles, the needles or styluses being adjustably carried by the tone arm and extending diagonally from the upper and lower surface of the outer free end thereof, so that the tone arm may operatively contact the underside and top side respectively of the record to be played. Slicing means is provided for separating the lowermost record from the stack on the spindle above the turntable and for lowering the record into placement on the peripheries of the rollers, which constitute the record spacing and driving assembly. The tone arm construction and its operating mechanism are fully disclosed and claimed in my copending application Serial No. 296,558 filed July 1, 1952. Also release means is provided for raising the record from its driven engagement with the record spacing and driving assembly during the record changing cycle.

Generally speaking the operation of the record changing and playing mechanism will be constant and uninterrupted in a sequential manner, so that the various moving parts will be inoperative during the actual playing of the record, when the record will be rotated by the idler rollers driven by the turntable and the tone arm will ride inwardly relative to the center opening of the record through the engagement of the sound track by the stylus or needle.

As the tone arm is swung inwardly to playing position and then tilted upwardly so as to bring the needle extending upwardly from the outer end of the tone arm into engagement in the starting groove of the sound track on the bottom side of the record seated on the record spacing and driving assembly, a flexible pressure arm is swung inwardly relative to the spindle and embraces the spindle, the arm having antifriction means formed at its outer or free end, said means being adapted to rest upon the center portion of the record, which center portion is concentrically interposed between the center opening and the sound track. The pressure arm holds the record in positive engagement upon the rollers, so that a true non-slipping drive is produced between the turntable and the record.

A resistance arm is pivotally associated with the pressure arm and extends radially from the center of the record to the outer periphery thereof and rests upon the upper side of the record so that a firm and unyielding surface is presented to the upper needle of the tone arm which contacts the underside of the record.

After the underside of the record has been played, the tone arm is swung downwardly and outwardly to a rested position beyond the periphery of the record by the lifting and oscillating mechanism. Simultaneously, the pressure arm is raised and swung outwardly to a rested position in the opposite direction from the rested position than the tone arm. Lifting means, which is slidably disposed in a hollow spindle, is then moved upwardly to contact the center portion of the record and raise the record upwardly out of engagement with the connecting means or rollers. The arm, carrying the rollers, is then lifted and swung outwardly to a rested position adjacent the position of the pressure arm.

The record is then lowered onto the turntable by the lifting means, the clutch surface of the record interlocking with the clutch surface on the turntable or those of the previously lowered records resting upon the interlocked therewith. The tone arm is then swung inwardly and lowered in sequence by the lifting and oscillating mechanism and the record just deposited upon the turntable is played in a conventional manner upon its upper sound track by the stylus extending downwardly and outwardly from the tone arm. After the top side of the record has been played, the tone arm is lifted and swung outwardly to its rested position.

At this time, slicing means extending upwardly from the top of the cabinet disposed adjacent the outer peripheries of the stack of record is brought into operation to release the lowermost record in the stack on the spindle. At the same time, the arm carrying the rollers is swung inwardly and downwardly so as to bring the rollers into contact with the clutch surface of the record seated on the turntable. The record released from the stack, is now lowered downwardly on the spindle into a seated position on the peripheries of the rollers. The underside of the record is then played, as aforedescribed.

The apparatus as above generally described is further disclosed in my above identified copending applications, and reference is made thereto for a specific description of the associated structure and mechanism. It is to this apparatus that the present improvement has been applied and enough of this apparatus is herein illustrated and described to enable the construction and operation of this improvement to be understood. In general the same numerals are used in these drawings to identify parts which are the same as those disclosed in my prior copending application.

A casing or cabinet 10 is provided for housing the operating mechanism with a conventional turntable 12 rotatably mounted on the top wall 14 of the casing. The turnable is constructed with a depending annular flange and is provided with a snug fitting covering upon which is formed an annular undulated non-slipping positive interlocking clutching surface. The turntable may be of any of the constructions set forth in my copending application Serial No. 98,048, now Patent No. 2,729,455, issued Jan. 3, 1956; or Serial No. 296,382, filed June 30, 1952; or may include the flexible removable covering set forth in my above identified patent.

The records 20 may be of conventional construction, or of the specific construction set forth in my copending application Serial No. 296,383 filed June 30, 1952 now Patent No. 2,776,837, issued Jan. 8, 1957 for Positive Engagement Interlocking Record Disk, and are provided with integrally formed or detachable annular raised positive interlocking clutching surfaces 22. The surfaces 22 are formed on the top side and underside of the records in concentric relationship to the center opening and are serrated or otherwise treated to form a positive interlocking surface complementary to the corresponding interlocking driving surface on the turntable or turntable covering. A stationary hollow spindle 28 is secured to the top wall portion of the casing as by a lock nut 34.

The automatic record playing apparatus of my copending application Serial No. 98,048, now Patent No. 2,729,455, issued Jan. 3, 1956, includes a record spacing and supporting assembly and a pressure arm together with automatic driving means for each. The former includes geared rollers which rest upon and are geared to an interlocking clutch or driving ring on a turntable or a stack of records interlockingly engaged thereon; and which support and engage the interlocking clutch ring of a record resting upon the rollers whereby this latter record is supported above the turntable and through the supporting and driving engagement of the rollers is also rotated and driven by the turntable but in a reverse direction of rotation relative thereto. The pressure arm holds this supported record in firm driven engagement with the supporting rollers. Operating means are provided for causing a vertical raising and lowering movement and a separate horizontal swinging movement for each of the two above mentioned elements in order to automatically adjust their vertical elevation in accordance with the increasing height of the accumulating stack of records on the turntable; and in order to lift, withdraw and then return and lower these elements each time the automatic record changer functions. These operating mechanisms are both driven from the automatic timing and control mechanism of the phonograph record player and include a chain driven cam for each element with an actuating mechanism interposed therebetween. The above briefly described elements operate automatically when the apparatus is automatically playing both sides of a stack of records in sequence.

In the present invention I utilize the two elements as above set forth but provide further means whereby the two automatic driving means may be selectively rendered ineffective to actuate the two cam elements and whereby the pressure arm and the record spacing and supporting assembly may be rendered idle in a lifted and horizontally withdrawn position. This further means thereby enables the automatic changer portion of the player to sequentially lower records from the stack directly to the turntable whereby the top sides only of the records will be played sequentially.

Figures 3, 4, 5 illustrate the operating mechanism of the record spacing and supporting assembly with the selective control mechanism of this invention applied thereto, while Figures 3, 6, 7 and 8 illustrate the pressure arm operating mechanism with the selective control mechanism incorporated therewith.

As will be seen, the record spacing and supporting assembly operating mechanism and the pressure arm operating mechanism have substantially identical operation and substantially identical structure except for a slight mechanical change in the manual control levers and hence have been given the same numerals upon similar parts. Also, a deailed description of the similar parts of the pressure arm operating mechanism is omitted as being a mere duplication of that of the record spacing and supporting assembly operating mechanism.

Figure 1:
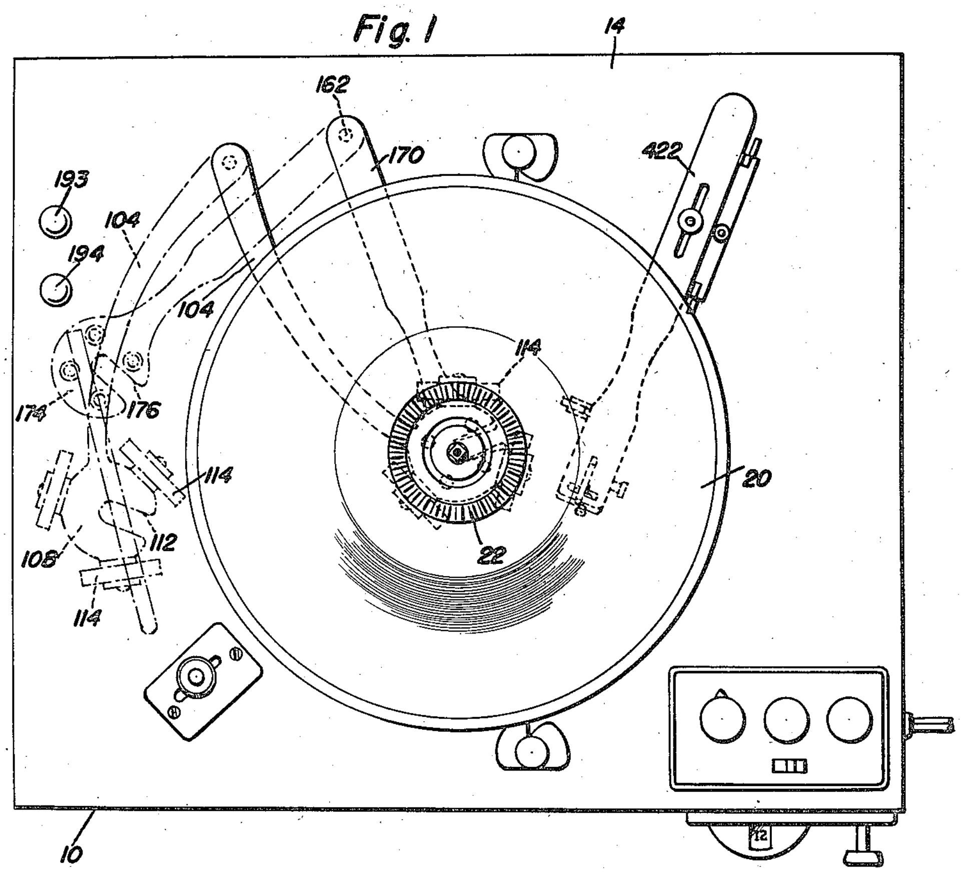
Figure 1 is a top plan view of a phonographic record player in accordance with this invention, certain concealed parts and certain alternative positions of parts being indicated by dotted lines.
Figure 2:
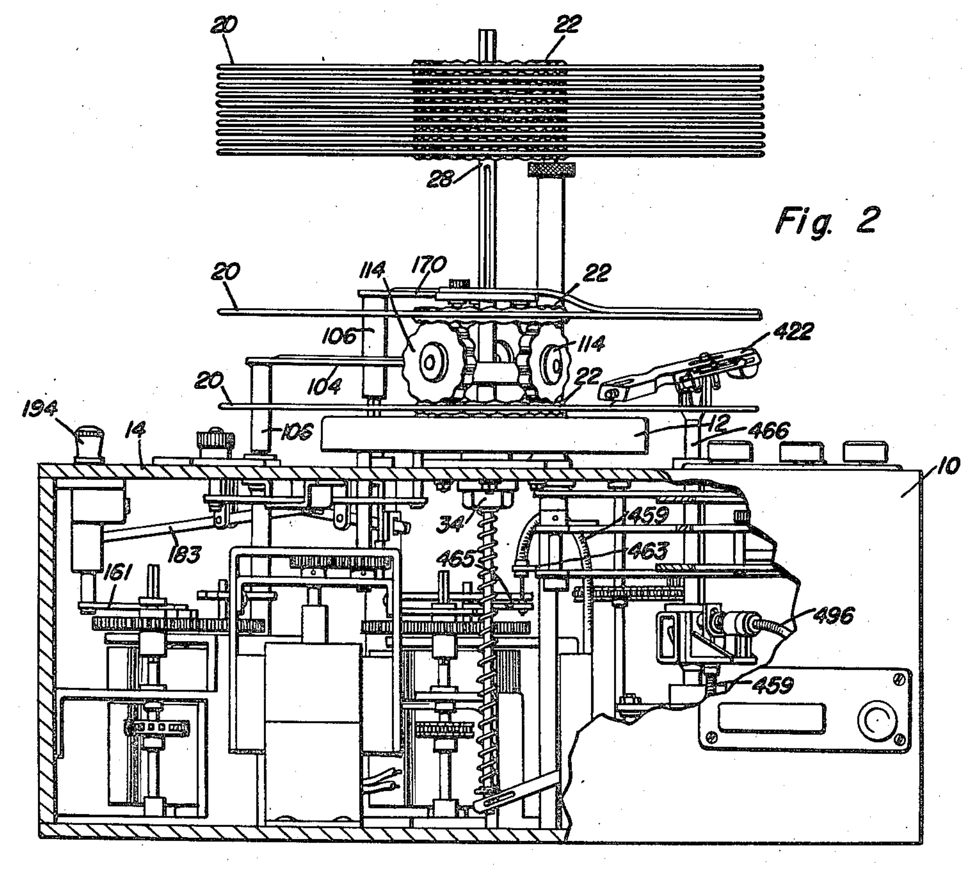
Figure 2 is a vertical sectional view, taken substantially upon the plane indicated by the broken section line 2—2 of Figure 3, of the apparatus of Figure 1, parts being shown in section and parts being shown in elevation therein.

The record spacing and supporting assembly operating mechanism, as shown in Figure 4, consists of a hollow shaft 96 which is vertically disposed through the top 14 of the casing and is formed with a laterally extending annular flange 98, secured within a locking sleeve structure 100 so as to prevent vertical movement of the shaft while permitting rotation thereof. A square or noncircular shaft 102, see Figures 1, 2, is slidably disposed within the correspondingly shaped hollow interior of the shaft 96 for axial sliding movement therein, but for rotative movement therewith. The square shaft 102 has at its upper end an arcuate arm 104 carried by a collar or sleeve 106. At its outer end, the arm 104 has a circular plate 108 which is formed with a radially disposed notch or cut out section 112, the latter providing a clearance adapted to embrace and receive the spindle 28 when the arm is moved inwardly relative to the center of the turntable. A plurality of rollers 114 which are peripherally toothed or undulated are rotatably journaled in equidistant fashion upon the periphery of the plate 108.

As noted particularly in Figure 2, the rollers are operatively interpoesd between the turntable or a record seated on the turntable and are interlockingly engaged therewith, and with an upper record which is resting upon and is driven by the rollers from the turntable or the records thereon.

In my copending application Serial No. 98,048, now Patent No. 2,729,455, issued Jan. 3, 1956, means have been set forth for automaticaly manipulating the shaft 102 to raise and lower the arm 104 to thereby elevate or lower the driving rollers; and to swing the arm and rollers horizontally to move the same outwardly from the turntable to an inoperative position during changing of the records and to move the rollers into an operative position for engagement with the turntable and the record supported and driven by the rollers. The present invention utilizes this means but further provides an additional means to selectively move the supporting and spacing rollers outwardly from the center of the turntable and to maintain the rollers in an inoperative position whereby the automatic record changing mechanism will function to sequentially lower the records from the stack above the turntable upon the spindle to the turntable or the records thereon to be played in the usual manner by the stylus or tone arm.

For this purpose, as shown best in Figures 4 and 6, there is provided a cylindrical cam 131, which is rotatably journaled by antifriction bearing assemblies 133 and 135, disposed in a central bore 137 within the cam, upon a vertical axle 139. The latter is suitably supported upon a plate 141 carried by the cabinet 10. At its upper end, the cam 131 has an upwardly extending axial spindle 143 upon which is fixedly secured a driving gear 145, retained as by a fastening nut 147. The gear 145 is adapted to mesh with a gear 149 which is splined upon and which is axially movable upon a shaft 151, as set forth hereinafter, which shaft is journaled in suitable bearings 153 and 155 and is provided with a driving gear. In the operating mechanism for the spacing and supporting assembly, as shown in Figure 4, this driving gear is shown at 157 and has a driving chain 159 attached thereto; while in the operating mechanism of the pressure arm, as shown in Figure 6, the driving gear 157 has a driving chain 184.

The hub of the gear 149 is provided with an annular groove at its upper end which is connected to a yoke or fork 148, whereby in a manner to be subsequently set forth, the gear 149 may be raised or lowered upon the shaft 151, thereby selectively disengaging or meshing the gear 149 with the gear 145 and thereby selectively controlling rotation of the cam 131. The cams 131, see Figures 9–12, are of a novel construction which are identical in the operating mechanism of both the spacing and supporting assembly and the pressure arm assembly; and during automatic operation of these assemblies are self-compensating for variations in the vertical positions thereof.

A peripheral, continuous cam groove 163 having a recess 163*a*, see Figure 9, forming a rest position is disposed in a horizontal plane upon the cylindrical exterior surface of the cam, this groove having however a vertically extending wedge-shaped depending recess 165. One wall 167 of this recess is substantially vertical and constitutes a fixed cam surface, while the other wall 169 is inclined and has a recess 121 in which is seated a leaf spring 123 having its flexible blade constituting a resilient or yieldable cam surface. The blade is normally inherently biased to the substantially vertical position of Figure 10. During operation of the cam, the cam follower, to be hereinafter described, flexes the blade to the position of Figure 11 against the wall 169 which thus supports the blade in a position to function as a cam track.

At its lower end, the shaft 102 has a laterally extending finger 171 swingably secured thereto as by a bolt 173, this finger being restrained against rotation as by a guide standard 175 suitably secured to the base of the cabinet, the finger having an antifriction cam follower engaging in the cam track 163, whereby upon rotation of the cam the shaft 102 and the spacing and support assembly carried thereby will be raised or lowered.

Secured to and extending laterally from the tubular member 96, as shown in Figure 3, is an actuating lever or arm 177 which is bifurcated or slotted as at 179, and in this slot is movably engaged an upstanding actuating pin 181 carried by the gear 145. It will thus be evident that as the gear is rotated an oscillatory movement will be imparted to the tubular shaft 96 to thereby cause horizontal swinging movement of the arm 104 and the rollers carried thereby. It will be further noted that for each revolution of the cam 131, both an oscillatory movement to and fro, and a vertical reciprocation will be imparted to the arm 104 and the driving rollers carried thereby.

The drive chain 159 engages the driving gear 180 whose operation is controlled by the record player control mechanism within the casing indicated generally by the numeral 182. As set forth in my prior application Serial No. 98,048, now Patent No. 2,729,455, issued January 3, 1956, the control mechanism which is herein indicated generally by the numeral 182, serves to impart motion to the chain 159 at the properly timed intervals in the automatic operation of the record player so as to produce the necessary vertical and horizontal movements of the record supporting and driving assembly hereinbefore referred to. Since the actual mechanism by which timed motion is imparted to the gear 180 does not form an essential of the present invention herein disclosed and claimed, a further explanation of the same will be unnecessary, it being merely understood that the chain 159 is operated in synchronized relation each time the control mechanism causes the phonograph record player to discard a record that has been played and to replace the same by a new record from the stack normally supported upon the spindle.

For the purposes of the present invention, I modify the driving connection between the chain 159 and the cam 131 by the structure hereinbefore described in order to enable the operator to selectively maintain the record supporting and driving means in a position withdrawn from the turntable and in an inoperative condition, to permit the rest of the automatic record player to continue its automatic functions of sequentially lowering a record from the stack upon the spindle to the turntable and sequentially playing the top sides of such records as lowered.

As set forth in my above mentioned copending application Serial No. 98,048, now Patent No. 2,729,455, issued January 3, 1956, there is further provided a pressure arm 170, terminating at its free end in a circular plate 174 provided with a radial slot 176 adapted for embracing the spindle 28 when the pressure arm is centered with respect to the turntable. The pressure arm is preferably of the construction disclosed and claimed in my last mentioned copending application, and is adapted to rest upon and apply pressure downwardly upon the record 20 which is resting upon the supporting rollers 114, to maintain a continuous driving engagement therebetween. At its end remote from the plate 174, the pressure arm is secured to the upper end of a shaft 162 by means of a collar or sleeve 106. The shaft 162 is in every respect similar to the shaft 102 and is associated with a cam 131 in the same manner as that set forth above in connection with the shaft 102. Consequently, a specific description of the construction and operation of these parts, shown in Figure 6, would be merely a duplication of that set forth in connection with the structure and operation of Figure 4, and is therefore deemed to be unnecessary, it being noted that the same numerals refer to the same parts in these two cam operating mechanisms. However, a drive chain 184 operatively connects this cam mechanism to a driving gear 186 likewise operatively driven by the timing and control mechanism 182 previously mentioned. Moreover, a fork or yoke 161 is associated with the hub of the gear 149 in Figure 6 whereby the gear may be selectively raised or lowered upon its driving shaft to selectively engage or disengage with the driving gear 145 of the cam 131. The operation of this assembly for raising and lowering and for horizontally swinging the pressure arm 170 is identical with that for the arm 104 and operates in properly timed relation with respect thereto.

The functioning of the operating means for the pressure arm assembly and for the record spacing and supporting assembly is identical and is as follows. When the cam 131 of either operating means is moved through one rotaion by chains 159 or 184, the finger 171 riding in the cam groove 163 will move up the resilient cam surface 123 from its normal rest position in the cam groove recess 165. As the finger moves upward to the horizontal portion of the groove, it lifts the members 102 or 162 thereby raising the arms 104 or 170 to their highest positions, whereby the rollers 114 will be lifted above and out of contact with the stack of records resting on the turntable and the pressure plate 174 will be lifted above and out of contact with the record supported by the rollers 114.

As the finger passes through the horizontal portion of the cam groove 163 and starts down the fixed cam surface 167 into the cam recess 165, the rods 102 or 162 and rollers 114 or pressure arm 170 are lowered until they respectively engage the turntable or stack of records thereon or the record resting on the rollers 114.

It will be apparent that the downward travel of the fingers into the recess 165 will depend upon the number of records upon the turntable. If the rollers 114 directly engage the turntable, finger 171 will be substantially at the bottom of the recess 165 and upon the next rotation of the cam will travel up the entire length of the resilient cam blade 123 and the wall 169, flexing the blade 123 against the latter. As records are accumulated upon the turntable the positions of the rollers 114 and pressure arm 170 will be progressively higher causing the finger 171 to stop its descent at progressively higher position in the recess 165.

By this arrangement compensation for the varying positions of the arms 104 and 170 is obtained without varying the overall lengths of the members 102, 162 and their associated mechanism.

Reference is now made more particularly to Figures 7 and 8 for an understanding of the mechanism by which the pressure arm assembly is selectively rendered operative or inoperative. A lever 183 is journaled intermediate its ends upon a fulcrum 185 carried by a bracket 187 and secured to the underside of the top wall 14 of the cabinet. At one end, the lever 183 is pivoted at 189 to a plunger 191 which is slidable through a bore in the top wall 14 of the cabinet, and is provided with a finger grip portion 193 thereabove whereby vertical movement may be imparted to the plunger. In order to lock the plunger and lever in adjusted position, a conventional form of spring urged detent mechanism is provided indicated generally by the numeral 195. This detent mechanism enables the lever to be locked in either of two positions, one of which as set forth hereinafter will cause engagement of the gears 145 and 149 and therefore driving of the cam 131, and the other of which will effect disengagement of these gears thereby rendering the cam idle, even though the control mechanism 182 will continue to periodically impart motion to the chain 184.

At its other end, the lever 183 is pivoted at 197 to a second lever 199 which likewise is journaled intermediate its ends at 201 to a supporting bracket 203. At its other end, the lever 199 extends through a vertical slot 205 in a support and guide bracket 207 carried by the top wall of the casing, and engages in a slot 209 in the upstanding or vertical arm 211 of the previously mentioned fork 161.

The selector control lever assembly of the operating mechanism of the spacing and supporting assembly is slightly different from that of the pressure arm assembly operating mechanism since it is located nearer the side of the cabinet as will be apparent from Figures 1, 2 and 3. A manual operating knob 194, similar to the knob 193 is provided and the same detent mechanism 195 is utilized, as shown in Figure 5. However, the lower end of the plunger 191 of the knob 194 has a rigidly attached horizontal blade or arm comprising the yoke 148 previously mentioned. The operation of this manual selector control of the operating mechanism of the pressure arm directly raises or lowers the yoke 148 and hence the gear 149 and is identical with that set forth in connection with the pressure arm operating mechanism.

The automatic record playing apparatus of my prior application Serial No. 98,048, now Patent No. 2,729,455, issued Jan. 3, 1956 included a novel tone arm and operating mechanism therefor, whose construction and functioning are more specifically disclosed and claimed in my copending application Serial No. 296,558, filed July 1, 1952. The improvements of the present invention include means interposed in the tone arm operating mechanism and forming a part of the hereinbefore described selective control mechanism for simultaneous altering and modifying the automatic cycle of operation of the tone arm. Thus, the upward tilting movement of the tone arm to engage its upper stylus with the undersurface of a record is prevented when the selective control mechanism is activated to cause the automatic playing of the top sound tracks only of a stack of records.

Attention is now directed to Figures 1–3, 7, 8, 13–15. A tone arm 422 is pivoted intermediate its ends in a manner, not shown, to a hollow shaft 466 carried by an enlarged housing 468 which in turn is supported by a post 472. The latter, by suitable mechanism, not shown, is vertically reciprocated and rotated to position the tone arm during its cycle of operation.

The tone arm construction and its operating mechanism as above set forth generally, have been fully set forth and claimed in my copending application Serial No. 296,558.

In order to tiltably raise or lower the tone arm and styluses for selectively playing the lower or bottom sound tracks of records, the tone arm operating mechanism included a pair of cables 482 and 484 (see Figures 13 and 14) connected to the tone arm on opposite sides of its pivotal mounting upon the hollow shaft 466, these cables extending through the shaft 466 and into the housing 468. The cables are connected to two upper corners of a triangular control plate 486 pivoted at its lower corner on a shaft 488 journaled in the housing 468. A segmental gear 490 is fixedly secured to one side of the control plate for oscillating the same about its pivotal axle 488. A gear 491 on a stub axle or shaft 492 journaled in a side wall of the housing 468 engages the segmental gear 490 for oscillating the control plate 486 and thus selectively tilting the tone arm either up or down.

In application Serial No. 296,558, the shaft 492 was detachably connected to a flexible drive shaft 495 protectively disposed in a flexible housing 496, and which drive shaft is connected to the control mechanism 182. In accordance with the improvement, however, a releasable coupling is interposed betwen the drive shaft 495 and the stub axle 492.

Suitably attached to the housing 468 is a bracket 423 upon which is supported a bushing 425 rotatably journaling a sleeve 427 therein. An axial, non-circular bore 429 in the sleeve 427 slidingly receives the correspondingly shaped extremity 431 of the drive shaft 495, which is releasably held seated in the bore by a coupling nut 433 which is threaded upon the bushing 425. A compression spring 435 surrounds the sleeve 427, urging the sleeve towards the stub axle 492 with which it is aligned.

The adjacent ends of the stub axle and sleeve are provided with conical extremities 437 and 439 respectively, the latter having a driving spindle 441 whose blade-like terminal 433 is slidably keyed in a slot 445 in the former.

It will be understood that the spring yieldingly urges the blade 443 into the slot 445, as seen in Figure 13, to maintain driving engagement of the drive shaft 495 with the stub axle 492. This driving engagement is selectively broken, by moving the sleeve to the right, as seen in Figure 15, under the control of the selective control mechanism by a means to be now described.

Secured to the bottom of the bracket 423 is a guide housing 447 having a slide 449 therein, provided with a sloping cam surface 451 and a flat upper end 453 which is vertically slotted at 455 to receive the spindle 441. When the slide is in the lower position of Figure 13, the flat end portion 453 lies between the conical extremities 437 and 439 but out of contact therewith; but when the slide is raised as in Figure 15, the cam surface 451 engages the conical surface 439 and pushes the sleeve 427 to the right, against the spring 435, thereby disconnecting the members 443 and 445 and uncoupling the stub axle 492 and drive shaft 495.

Vertical travel of the slide 449 is caused by a flexible cable 457 which extends through the bottom of the bracket 423 and is attached to the slide. A flexible tubing 459 surrounds and protects the cable 457, having one end removably secured to the bracket by a coupling nut 461. At its other end, the tubing 459 as shown in Figures 3, 7 and 8, is mounted upon a suitable support bracket 463 carried by the casing 10 while the cable 457 is fastened to an extension arm or plate 465 secured to the end of the fork or yoke 161.

By the above described mechanism, the control plate 486 is disconnected from its drive shaft 495 and rendered inoperative when the pressure arm and the record spacing and supporting assembly operating mechanisms are rendered idle.

The operation of the apparatus including the present improvement is as follows.

The timing and control mechanism which synchronizes the automatic actuation of the various subassemblies of the automatic record player, indicated generally by the numeral 182, causes intermittent timed operation of the chains 159 and 184 when the record changing portion of the apparatus is energized for discarding a record previously played and for placing a new record in playing position. In accordance with the disclosure of my prior application Serial No. 98,048, now Patent No. 2,729,455, issued Jan. 3, 1956, these chains and associated mechanism will in properly timed relation lift the pressure arm and the driving roller supporting arm from their operative positions, then turn these arms horizontally to swing them out from the records. In timed relation the other mechanism of the phonograph record player will discard the record supported by the rollers by lowering it to the turntable. The above mentioned arms are then restored to proper position with the next record being lowered from the stack and resting upon the supporting rollers and the pressure arm resting upon this lowered record. During this operation, the mechanism 182 will also raise, lower and rotate the tone arm in properly timed relation, and also through the drive shaft 495 will tilt and lower the tone arm to selectively play the upper and lower sound tracks of records. However, when it is desired to omit this automatic operation by which both sides of the record are played in sequence, the knobs 193 and 194 are manipulated when the arms 104 and 170 have been swung outwardly to one side of the turntable, whereby the forks 161 and 148 will be manipulated to cause the gears 149 to disengage from the gears 145, by means of which the cams 131 which control the lifting and turning of the roller supporting arm and the pressure arm will be disengaged from the turntable and records and from their chain drive mechanism, causing these arms to remain outwardly from the turntable. Actuation of the levers 183, 199 to stop automatic operation of the pressure arm will through the associated connections simultaneously cause cessation of the automatic tilting of the tone arm. Thus, the tone arm tilting mechanism, the pressure plate assembly and the record spacing and supporting assembly are simultaneously rendered temporarily inoperative. In this position, the operation of the rest of the apparatus will automatically in sequence lower records from the stack down upon the turntable and will play these records upon the top side only in automatic sequence in accordance with usual practice.

It should be noted that even though the supporting and driving means is withdrawn to one side and maintained in inoperative position, the pressure arm assembly may still be operated to impart pressure to the record or stack of records resting upon the turntable to prevent relative slippage of any record. Alternatively, of course, both the pressure arm assembly and the supporting and driving means may be withdrawn to their inoperative positions.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

What is claimed as new is as follows:

1. An automatic record player including a turntable, means for supporting and driving a record above said turntable, a tone arm having upwardly and downwardly projecting styluses, means for interposing and withdrawing said tone arm from a position between the turntable and a record on said supporting and driving means, a record changer for successively moving records from a stack to said supporting and driving means and thereafter from the latter to the turntable, means for tilting said tone arm to cause its upwardly projecting stylus to engage the sound track on the bottom side of a record on said supporting and driving means, means for lowering said tone arm to cause its downwardly projecting stylus to engage the sound track on the top side of a record on said turntable, means for selectively preventing operation of said tilting means, means for applying pressure to a record on said supporting and driving means, means for moving said pressure applying means into and out of operative position, means for moving said supporting and driving means into and out of position, means for maintaining said last two means out of position and simultaneously preventing operating of said tilting means.

2. An automatic record player comprising a turntable, means supported and driven by said turntable for supporting and driving a record in a plane parallel to that of said turntable, a tone arm having a pair of needles for successively playing both sides of a record as it rests in succession upon said supporting and driving means and said turntable, a record changer mechanism for sequentially lowering records from a stack to said supporting and driving means and from the latter to said turntable, means for raising and lowering and further means for horizontally swinging said supporting and driving means, means connecting each of said raising and lowering means and said further means to said record changer mechanism in synchronized relation, said raising and lowering means including a vertical supporting shaft, a cylindrical cam rotatable upon a vertical axis and operatively connected to said supporting shaft, means affording lost motion between said cam and supporting shaft to enable the supporting and driving means to be disposed at different vertical positions to accommodate itself to a varying number of records upon the turntable, said cam having a cam groove therein with one wall of said groove being fixed and extending axially of said cam and the other wall having a yieldable portion, a cam follower roller carried by said supporting shaft and engaged in said cam groove, said yieldable portion resiliently urging said follower against said fixed wall.

3. An automatic record player comprising a turntable, means operatively connected to said turntable for supporting and driving a record in a plane spaced from the turntable, a sound reproducing means for successively reproducing the recordings upon the bottom and top sides of a record as it rests in succession upon said supporting and driving means and said turntable, a record changer mechanism including means for automatically and sequentially, controllably and gradually lowering records from a stack above the turntable to said supporting and driving means and from the latter to the turntable, automatic actuating means for automatically and in synchronized relation to the operation of the record player moving said supporting and driving means into and out of operative connection to the turntable, selector control means for rendering said automatic actuating means inoperative whereby said supporting and driving means may be temporarily retained out of operative connection to said turntable and said means for lowering records will be effective to automatically gradually lower records from a stack to the turntable for reproducing the top sides only of the records in sequence, said automatic actuating means including means for moving said supporting and driving means vertically of said turntable and further means for horizontally swinging said supporting and driving means towards and from the center of the turntable, said selector control including operative connection with said means for moving vertically and said further means whereby to temporarily prevent operation of both of said two last mentioned means.

4. The combination of claim 3, wherein said supporting and driving means includes a plurality of supporting and driving elements disposed for movement into position to engage a record at the central portion and within the sound track of the same.

5. The combination of claim 3, wherein said supporting and driving means includes a plurality of supporting and driving elements disposed for movement into position to engage a record at the central portion and within the sound track of the same, said supporting and driving elements being all journaled upon a single member, said member being mounted for horizontal swinging movement upon a single vertical axis disposed outwardly of the rim of the turntable.

6. An automatic record player comprising a turntable, means operatively connected to said turntable for supporting and driving a record in a plane spaced from the turntable, a sound reproducing means for successively reproducing the recordings upon the bottom and top sides of a record as it rests in succession upon said supporting and driving means and said turntable, a record changer mechanism including means for automatically and sequentially, controllably and gradually lowering records from a stack above the turntable to said supporting and driving means and from the latter to the turntable, automatic actuating means for automatically and in synchronized relation to the operation of the record player moving said supporting and driving means into and out of operative connection to the turntable, selector control means for rendering said automatic actuating means inoperative whereby said supporting and driving means may be temporarily retained out of operative connection to said turntable and said means for lowering records will be effective to automatically gradually lower records from a stack to the turntable for reproducing the top sides only of the record in sequence, pressure means engageable with a record at the central portion and within the sound track of the same to hold the record in firm contact with said supporting and driving means, actuating means for automatically and in synchronized relation to the operation of the record playing moving the pressure means into and out of operative contact with a record supported by said supporting and driving means, additional means for temporarily preventing operation of said last mentioned actuating means whereby said pressure means may be temporarily retained in out of operative contact with a record.

7. An automatic record player comprising a turntable, means operatively connected to said turntable for supporting and driving a record in a plane spaced from the turntable, a sound reproducing means for successively reproducing the recordings upon the bottom and top sides of a record as it rests in succession upon said supporting and driving means and said turntable, a record changer mechanism including means for automatically and sequentially, controllably and gradually lowering records from a stack above the turntable to said supporting and driving means and from the latter to the turntable, automatic actuating means for automatically and in synchronized relation to the operation of the record player moving said supporting and driving means into and out of operative connection to the turntable, selector control means for rendering said automatic actuating means inoperative whereby said supporting and driving means may be temporarily retained out of operative connection to said turntable and said means for lowering records will be effective to automatically gradually lower records from a stack to the turntable for reproducing the top sides only of the records in sequence, said automatic actuating means including a cam, means interposed operatively between said cam and said supporting and driving means, a driving assembly connected to said cam and to said record changer mechanism, said selector control means being connected to said driving assembly for selective engagement and disengagement of the latter.

8. The combination of claim 6, wherein one of said actuating means includes a cam and a driving assembly operatively connected to said cam and to said record changer mechanism, said selector control means being connected to said driving assembly for selective engagement and disengagement of the same.

9. The combination of claim 6, wherein each of said actuating means includes a cam and a driving assembly operatively connected thereto and to said record changer mechanism, said selector control means being connected to each driving assembly for simultaneous selective engagement and disengagement thereof.

10. The combination of claim 3, wherein said supporting and driving means includes a plurality of supporting and driving elements disposed for movement into position to engage a record at the central portion and within the sound track of the same, said supporting and driving elements being all journaled upon a single member, said member being mounted for horizontal swinging movement upon a single vertical axis disposed outwardly of the rim of the turntable, said actuating means including a cam member and a cam follower on said shaft operatively connected to said cam member for imparting vertical movement to said supporting and driving means and means operatively connected to said cam member and to said shaft for imparting horizontal swinging movement to the latter.

11. An automatic record player comprising a turntable, means operatively connected to said turntable for supporting and driving a record in a plane spaced from the turntable, a sound reproducing means for successively reproducing the recordings upon the bottom and top sides of a record as it rests in succession upon said supporting and driving means and said turntable, a record changer mechanism including means for automatically and sequentially, controllably and gradually lowering records from a stack above the turntable to said supporting and driving means and from the latter to the turntable, automatic actuating means for automatically and in synchronized relation to the operation of the record player moving said supporting and driving means into and out of operative connection to the turntable, selector control means for rendering said automatic actuating means inoperative whereby said supporting and driving means may be temporarily retained out of operative connection to said turntable and said means for lowering records will be effective to automatically gradually lower records from a stack to the turntable for reproducing the top sides only of the records in sequence, said supporting and driving means including a plurality of supporting and driving elements disposed for movement into position to engage a record at the central portion and within the sound track of the same, said supporting and driving elements being all journaled upon a single member, said member being mounted for horizontal swinging movement upon a single vertical axis disposed outwardly of the rim of the turntable, said actuating means including a cam member and a cam follower on said shaft operatively connected to said cam member for imparting vertical movement to said supporting and driving means and means operatively connected to said cam member and to said shaft for imparting horizontal swinging movement to the latter, said last means comprising a tube slidably but non-rotatably receiving said shaft, an arm on said tube, operating means on said cam member connected to said arm.

12. In an automatic record player, means operatively connected with a turntable for supporting and driving a record in a plane spaced from the turntable whereby the underside of the record may be reproduced, said supporting and driving means including a support arm having a plurality of supporting and driving rollers journaled thereon, a vertically movable and horizontally rotatable shaft carrying said support arm, means for imparting horizontal swinging movement to said shaft and support arm in timed relation to the cyclic operation of the record player, means for imparting vertical movement to the shaft and arm in timed relation to the cyclic operation of the record player, said horizontal movement means includes a member slidably but non-rotatably embracing said shaft.

13. An automatic record player comprising a turntable, means operatively connected to said turntable for supporting and driving a record in a plane spaced from the turntable, a sound reproducing means for successively reproducing the recordings upon the bottom and top sides of a record as it rests in succession upon said supporting and driving means and said turntable, a record changer mechanism including means for lowering records from a stack above the turntable to said supporting and driving means and from the latter to the turntable, automatic actuating means for automatically and in synchronized relation to the operation of the record player moving said supporting and driving means into and out of operative connection to the turntable, selector control means for rendering said automatic actuating means inoperative whereby said supporting and driving means may be temporarily retained out of operative connection to said turntable and said means for lowering records will be effective to automatically gradually lower records from a stack to the turntable for reproducing the top sides only of the records in sequence, said automatic actuating means including a cam, means interposed operatively between said cam and said supporting and driving means, a driving assembly connected to said cam and to said record changer mechanism, said selector control means being connected to said driving assembly for selective engagement and disengagement of the latter.

14. An automatic record player comprising a turntable, means operatively connected to said turntable for supporting and driving a record in a plane spaced from the turntable, a sound reproducing means for successively reproducing the recordings upon the bottom and top sides of a record as it rests in succession upon said supporting and driving means and said turntable, a record changer mechanism including means for automatically and sequentially lowering records from a stack above the turntable to said supporting and driving means and from the latter to the turntable, automatic actuating means for automatically and in synchronized relation to the operation of the record player moving said supporting and driving means into and out of operative connection to the turntable, selector control means for rendering said automatic actuating means inoperative whereby said supporting and driving means may be temporarily retained out of operative connection to said turntable and said means for lowering records will be effective to automatically gradually lower records from a stack to the turntable for reproducing the topsides only of the record in sequence, pressure means engageable with a record at the central portion and within the sound track of the same to hold the record in firm contact with said supporting and driving means, actuating means for automatically and in synchronized relation to the operation of the record playing moving the pressure means into and out of operative contact with a record supported by said supporting and driving means, additional means for temporarily preventing operation of said last mentioned actuating means whereby said pressure means may be temporarily retained in out of operative contact with a record.

15. The combination of claim 14 wherein one of said actuating means includes a cam and a driving assembly operatively connected to said cam and to said record changer mechanism, said selector control means being connected to said driving assembly for selective engagement and disengagement of the same.

16. The combination of claim 14 wherein each of said actuating means includes a cam and a driving assembly operatively connected thereto and to said record changer mechanism, said selector control means being connected to said driving assembly for simultaneous selective engagement and disengagement thereof.

References Cited in the file of this patent

UNITED STATES PATENTS

| | | |
|---|---|---|
| 2,506,926 | Johnson | May 9, 1950 |
| 2,555,895 | Lynch | June 5, 1951 |
| 2,611,619 | Cambron et al. | Sept. 23, 1952 |
| 2,622,885 | Mullaney et al. | Dec. 23, 1952 |
| 2,637,558 | Fisher | May 5, 1953 |
| 2,637,559 | Stolberg | May 5, 1953 |
| 2,697,608 | Vanderzee et al. | Dec. 21, 1954 |
| 2,729,455 | Mueller | Jan. 3, 1956 |

FOREIGN PATENTS

| | | |
|---|---|---|
| 632,233 | Great Britain | Nov. 18, 1949 |